(12) United States Patent
Kim et al.

(10) Patent No.: US 10,364,862 B2
(45) Date of Patent: Jul. 30, 2019

(54) ACTIVE ENGINE MOUNTING DEVICE

(71) Applicants: Hyundai Motor Company, Seoul (KR); Kia Motors Corporation, Seoul (KR)

(72) Inventors: Jin Woo Kim, Gyeonggi-do (KR); Jang Ho Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/826,419

(22) Filed: Nov. 29, 2017

(65) Prior Publication Data
US 2019/0136938 A1    May 9, 2019

(30) Foreign Application Priority Data
Nov. 6, 2017   (KR) .................. 10-2017-0146628

(51) Int. Cl.
*F16F 9/50*    (2006.01)
*F16F 9/34*    (2006.01)

(52) U.S. Cl.
CPC ............... *F16F 9/50* (2013.01); *F16F 9/34* (2013.01); *F16F 2222/123* (2013.01)

(58) Field of Classification Search
CPC .......... F16F 9/50; F16F 9/34; F16F 2222/123; F16F 13/26; F16F 13/262
See application file for complete search history.

(56) References Cited

U.S. PATENT DOCUMENTS

| 4,836,515 A * | 6/1989 | Franz | F16F 13/262 248/566 |
| 2011/0042872 A1* | 2/2011 | Hasegawa | F16F 13/26 267/140.14 |

* cited by examiner

*Primary Examiner* — Melanie Torres Williams
(74) *Attorney, Agent, or Firm* — Mintz Levin Cohn Ferris Glovsky and Popeo, P.C.; Peter F. Corless

(57) ABSTRACT

An active engine mounting device is provided. The active engine mounting device includes upper and lower liquid chambers partitioned by a valve unit and adjusts a vibration and a load input from an engine in response to a driving condition while a fluid passes through the valve unit and attenuates the vibration and the load. The active engine mounting device includes an insulator that encloses a core integrally formed with a mounting bolt and elastically deformed based on the load applied to the core. A main case is disposed at a circumference of a lower end portion of the insulator. A diaphragm is disposed under the main case. The valve unit is configured to selectively pass the fluid through three channels based on operation of the valve. An actuator is disposed through an auxiliary case to drive the valve in an axial direction.

7 Claims, 6 Drawing Sheets

US 10,364,862 B2

ACTIVE ENGINE MOUNTING DEVICE

CROSS-REFERENCE TO RELATED APPLICATION

This application claims priority to and the benefit of Korean Patent Application No. 10-2017-0146628 filed on Nov. 6, 2017, the entire contents of which are incorporated herein by reference.

BACKGROUND

(a) Field of the Disclosure

The present disclosure relates to an active engine mounting device, and more particularly, to an active engine mounting device capable of controlling dynamic characteristics by selectively changing a channel in response to a driving condition.

(b) Description of the Related Art

Generally, an engine of a vehicle is mounted in an engine compartment of a vehicle body by an engine mounting device to attenuate a vibration. As the engine mounting device, a rubber mounting device insulating and attenuating vibrations by an elastic force of rubber and a hydraulic mounting device configured to fill a predetermined amount of fluid are typically used. For example, the hydraulic mounting device has a fluid filled therein and attenuates vibrations using a flow of the fluid. The hydraulic mounting device simultaneously attenuates vibrations in a high frequency region and a low frequency region, and therefore applications related thereto have been increased.

However, the existing hydraulic mounting device as described above has a problem in that upon the manufacturing, when the filling amount of the fluid is increased, a loss coefficient is increased but the dynamic characteristics are increased, and thus noise, vibration, harness (NVH) performance of a vehicle is reduced. When the filling amount of the fluid is reduced, the dynamic characteristics are reduced, and thus the NVH performance is improved however, the loss coefficient is reduced. Accordingly, an active engine mounting device capable of actively controlling attenuation characteristics to more efficiently attenuate vibrations in a specific frequency domain has been developed.

The existing active engine mounting device has a solenoid valve disposed therein to control the dynamic characteristics in an on and off manner. The active engine mounting device has used the solenoid valve to alter the dynamic characteristics in response to a driving condition to simultaneously satisfy the NVH performance and ride and handling (R&H) performance of the vehicle. However, the entire weight and size are increased due to the addition of the solenoid valve. Additionally, as the separate controller and logic for controlling the solenoid valve are required, the total cost may be increased.

The above information disclosed in this section is merely for enhancement of understanding of the background of the disclosure and therefore it may contain information that does not form the prior art that is already known in this country to a person of ordinary skill in the art.

SUMMARY

The present disclosure provides an active engine mounting device which is configured to selectively pass a fluid through three channels by operating a valve formed at a center a valve housing and a valve cover, disposed in a main case to adjust a vibration and a load input from an engine in response to each driving condition and efficiently attenuate the vibrations and loads.

In an aspect of an exemplary embodiment of the present disclosure, an active engine mounting device may include an upper liquid chamber and a lower liquid chamber partitioned therein by a valve unit and configured to adjust a vibration and a load input from an engine in response to a driving condition while a fluid filled in each liquid chamber passes through the valve unit and attenuate the vibration and the load. The active engine mounting device may include an insulator that encloses a core integrally formed with a mounting bolt and elastically deformed based on the load applied to the core, a main case disposed at a circumference of a lower end portion of the insulator, a diaphragm disposed under the main case, the valve unit configured to selectively pass the fluid through three channels based on an operation of the valve disposed at a center when a valve housing and a valve cover are assembled in the main case and an actuator disposed through an auxiliary case to drive the valve in an axial direction, at a lower portion of the diaphragm.

The valve unit may include a valve housing having a first chamber with a plurality of first barriers disposed in a set section at a predetermined interval along a circumference of the valve operating aperture formed at a center thereof, annular second barriers formed on a radial exterior side of the first barriers while being spaced from each other at a predetermined interval, at least one aperture connected with the lower liquid chamber formed on a bottom surface thereof to be formed between the first barriers and the second barrier, and a second chamber having annular third barriers formed on a radial exterior side of the second barrier while being spaced apart from each other at a predetermined interval and connected with the valve operating aperture together with the second barrier, a valve cover coupled to an upper portion of the valve housing, having a first inflow aperture connected with the second chamber provided with one side thereof, and having a second inflow aperture penetrating therethrough and disposed at a center thereof, corresponding to the valve operating aperture, a membrane disposed to enclose the first barriers, in the first chamber and a valve vertically guided by the first barriers through the valve operating aperture, having a stepped groove at an upper circumference thereof, corresponding to the first barriers and a hollow channel open to one side connected with the second chamber connected with the lower liquid chamber.

In some exemplary embodiments, the second inflow aperture may be formed in plural along a circumference of a cap portion penetrating through the center of the valve cover and protruding in an upward direction, and a circumference surface of the upper end portion of the valve may be formed as an inclined blocking surface. The second chamber may have a bottom surface formed in a spiral shape. The valve cover may have a plurality of support ends that support the membrane formed at a central portion of a lower surface thereof. The membrane may be formed as a plate of an elastic material that is deformed based on a pressure of fluid. The actuator may be a linear step motor.

Additionally, the plurality of channels may include a first channel that may be formed from the upper liquid chamber to the lower liquid chamber through the second inflow aperture, the stepped groove, between the first barriers, the membrane, the first chamber, and the aperture. A second channel may be formed from the upper liquid chamber to the lower liquid chamber through the first inflow aperture, the second chamber, the valve operating aperture, and the hollow channel. A third channel may be formed from the upper liquid chamber to the lower liquid chamber through the second inflow aperture, the valve operating aperture, and the stepped groove.

According to an exemplary embodiment of the present disclosure, the three channels formed by the valve housing and the valve cover disposed in the main case may be configured to selectively open and close by the operation of the valve connected to the linear step motor to move the fluid. Accordingly, the vibration and the load input from the engine may be adjusted in response to the driving condition and may be more effectively attenuated.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Hereinafter, an exemplary embodiment of the present disclosure will be described with reference to the accompanying drawings. However, the following illustrated drawing and the detailed description to be described below relate to one exemplary embodiment among several exemplary embodiments for effectively describing features of the present disclosure. Therefore, the present disclosure is not limited to only the following drawings and descriptions.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
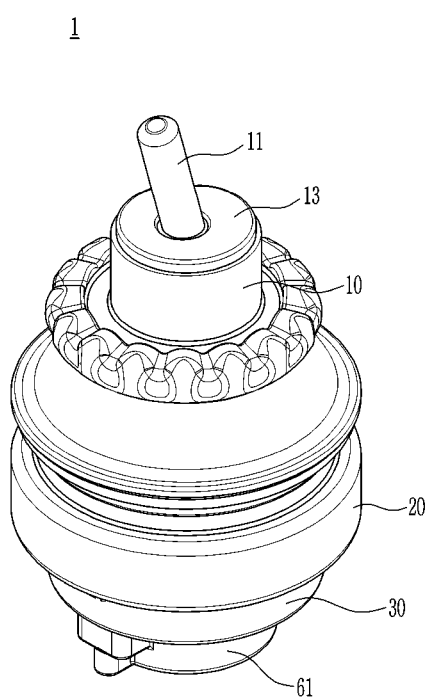
FIG. 1 is an exemplary assembled perspective view of an active engine mounting device according to an exemplary embodiment of the present disclosure.
Figure 2:
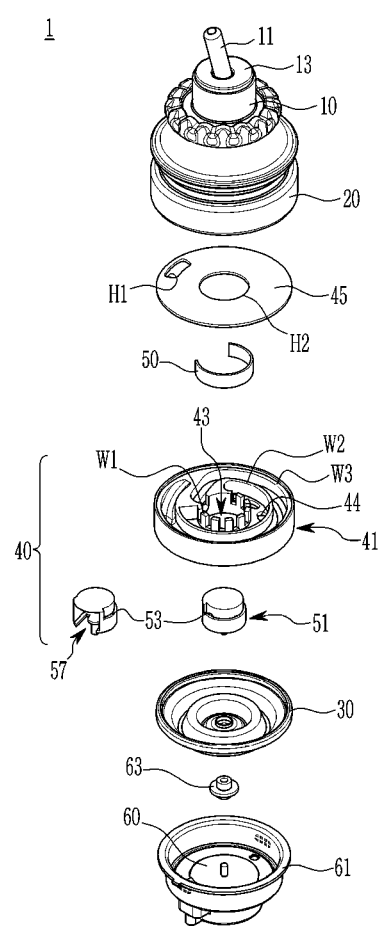
FIG. 2 is a detailed an exemplary view of the active engine mounting device according to an exemplary embodiment of the present disclosure.
Figure 3:
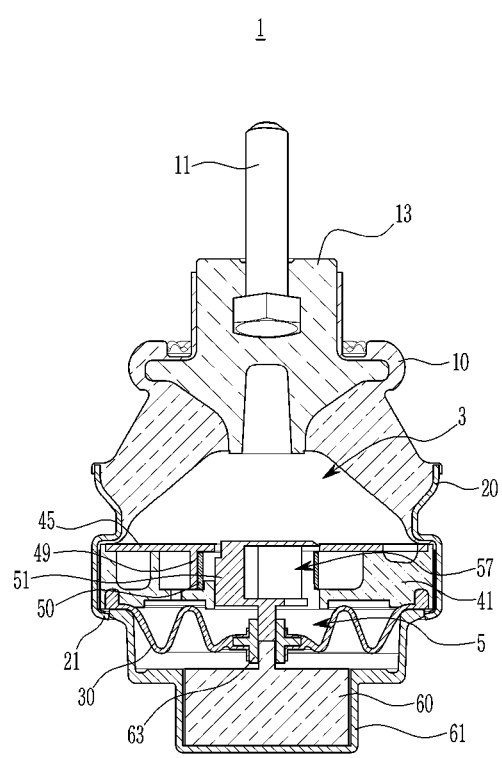
FIG. 3 is an exemplary cross-sectional view of the active engine mounting device according to an exemplary embodiment of the present disclosure.
Figure 4:
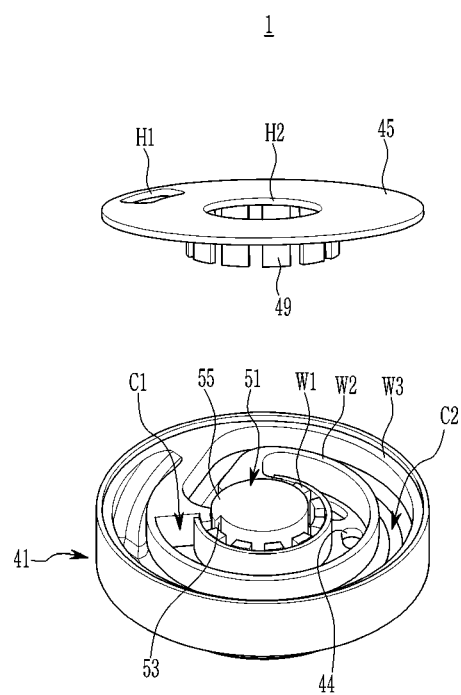
FIG. 4 is an exemplary perspective view of a valve unit applied to the active engine mounting device according to an exemplary embodiment of the present disclosure.

FIG. 1 is an exemplary assembled perspective view of an active engine mounting device according to an exemplary embodiment of the present disclosure. FIG. 2 is an exemplary detailed of the active engine mounting device according to an exemplary embodiment of the present disclosure. FIG. 3 is an exemplary cross-sectional view of the active engine mounting device according to an exemplary embodiment of the present disclosure. FIG. 4 is an exemplary perspective view of a valve unit applied to the active engine mounting device according to an exemplary embodiment of the present disclosure.

Referring to FIGS. 1 to 3, an active engine mounting device 1 according to an exemplary embodiment of the present disclosure may be configured to attenuate a vibration of an engine while supporting the engine and transfers the attenuated vibration to a vehicle body, and similarly attenuates the vibration transferred to the engine from a road surface through the vehicle body. In particular, the active engine mounting device 1 may include an upper liquid chamber 3 and a lower liquid chamber 5 partitioned therein, and may be configured to adjust a vibration input from an engine in response to a driving condition. The active engine mounting device 1 may include an insulator 10, a main case 20, a diaphragm 30, a valve unit 40, and an actuator 60.

An upper side of a housing (not shown) coupled to a vehicle body may be include a mounting bolt 11 connected to an engine. The mounting bolt 11 may be integrally formed with a core 13 and the mounting bolt 11 and the core 13 may be integrally formed by cast molding. Additionally, the insulator 10 encloses the core 13, and may be elastically deformed based on a load applied to the core 13. The insulator 10 may be formed from a rubber material or the like. In addition, the insulator 10 may be formed from any material having an elastic force. The main case 20 may be disposed at an interior circumference of a lower end portion of the insulator 10. In other words, the main case 20 may have a similar shape as an exterior surface of the lower end portion of the insulator 10. A predetermined section of the main case 20 may be bent inwardly along the circumference of the lower end portion to form a fixed end 21. The diaphragm 30 may be disposed under the main case 20. The diaphragm 30 may include a cavity in which a valve 51 to be described below is configured to move and fitted in a circumference of the lower end portion of the main case 20.

Referring to FIG. 4, the valve unit 40 may be disposed at an interior lower side of the main case 20 and may be supported by the fixed end 21 disposed on the main case 20. In addition, the valve unit 40 may be configured to selectively pass a fluid through a plurality of channels by operating the valve 51 disposed at a center thereof while the valve housing 41 and the valve cover 45 are assembled. For example, the plurality of channels may include first to third channels P1, P2, and P3. The first to third channels P1, P2, and P3 will be described below in detail.

The valve unit 40 may include the valve housing 41, the valve cover 45, a membrane 50, and the valve 51. First, the interior of the valve housing 41 may include a first chamber C1 and a second chamber C2, respectively. A center of the valve housing 41 may include a circular valve operating aperture 43. In addition, a set section of the valve housing 41 may include a plurality of first barriers W1 at a predetermined interval along a circumference of the valve operating aperture 43. In addition, in the valve housing 41, a radial exterior side of the first barrier W1 may include annular second barriers W2 spaced from each other at a predetermined interval. In the valve housing 41, the first chamber C1 may be disposed between the first barriers W1 and the second barrier W2. In particular, a bottom of the first chamber C1 may be disposed with a plurality of apertures 44. The plurality of apertures 44 may form a channel connected with a lower liquid chamber 5.

In other words, a radial exterior side of the second barrier W2 may be disposed with annular third barriers W3 spaced apart from each other at a predetermined interval. In the valve housing 41, the second chamber C2 connected with the valve operating aperture 43 may be disposed between the second barrier W2 and the third barrier W3. The bottom of the second chamber C2 may have a spiral shape to enable fluid movement.

The valve cover 45 may be coupled to an upper portion of the valve housing 41. One side of the valve cover 45 may be disposed with a first inflow aperture H1 connected with the second chamber C2. The valve cover 45 may have the second inflow aperture 112 penetrating therethrough and formed at the center thereof, corresponding to the valve operating aperture 43 of the valve housing 41. The second inflow aperture 112 may be an aperture that penetrates through the valve cover 45 and may be circularly formed at a central portion of the valve cover 45 to facilitate flow of a fluid.

The membrane 50 may be formed in an annular shape having a part of the membrane 50 cut and disposed in the first chamber C1. The membrane 50 may enclose the first barriers W1. In addition, the membrane 50 may support a central part of a bottom of the valve cover 45 by a plurality of support ends 49. The plurality of support ends 49 may be spaced apart from the second barrier W2 of the valve housing 41 at a predetermined interval in the radial exterior side. The membrane 50 may be formed as a rubber plate deformed based on a pressure of fluid.

The valve 51 may be guided vertically by the first barriers W1 through the valve operating aperture 43. An upper circumference of the valve 51 may be disposed with a stepped groove 53 that corresponds to the first barriers W1. The stepped groove 53 may be formed by partially cutting an exterior circumference of the valve 51 toward a central side. Additionally, the valve 51 may be opened to one side to be connected with the second chamber C2 to form a hollow channel 57 connected with the lower liquid chamber 5.

Further, the actuator 60 may be disposed under the diaphragm 30. The actuator 60 may be disposed through an auxiliary case to drive the valve 51 in an axial direction. The actuator 60 may be configured to connect a driving shaft with a central shaft of the valve. The portion where the actuator 60 and the valve 51 are connected with each other may include a connecting member 63 that encloses the exterior circumferential surface. At this time, the connecting member 63 may be coupled to the diaphragm 30. For example, the actuator 60 may be a linear step motor. In addition, similar to the actuator 60, the solenoid valve may also be applied.

Figure 5:
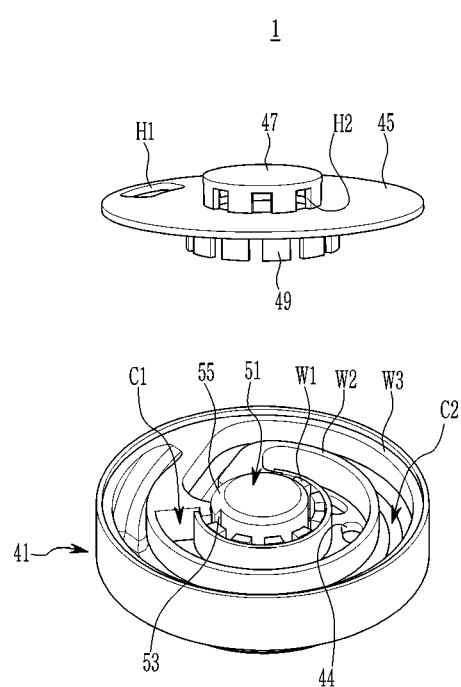
FIG. 5 is an exemplary perspective view of a valve unit applied to an active engine mounting device according to another exemplary embodiment of the present disclosure.

FIG. 5 is an exemplary perspective view of a valve unit applied to an active engine mounting device according to another exemplary embodiment of the present disclosure. In describing the active engine mounting device according to another exemplary embodiment illustrated in FIG. 5, for convenience of understanding, the same configuration as and the repeated description with the active engine mounting device according to the exemplary embodiment illustrated in FIGS. 2 to 4 described above will be omitted. In other words, the active engine mounting device according to another exemplary embodiment of the present disclosure may include a cap portion on the valve cover, based on the configuration of the active engine mounting device illustrated in FIGS. 2 to 4.

Referring to FIG. 5, in the active engine mounting device 1 according to another exemplary embodiment of the present disclosure, the center of the valve cover 45 may include the cap portion 47, that corresponds to the valve operating aperture 43 of the valve housing 41. The cap portion 47 may protrude in an upward direction and thus a circumference of the cap portion 47 may include the plurality of second inflow apertures H2. The cap portion 47 may be excessively applied with a resistance against the upper liquid chamber 3 to prevent an overload from being applied to the motor 60 connected with the valve 51 to be described below to thereby disperse the load.

The valve 51 may be formed as an inclined blocking surface 55 on which a circumference surface of the upper end portion is inclined, corresponding to the cap portion 47 applied to the active engine mounting device 1 according to another exemplary embodiment of the present disclosure. The inclined stepped surface 55 may be formed on the upper circumference surface corresponding to a connecting portion connected with which the valve operating aperture 43 and the second chamber C2 on the valve 51 may be connected. In other words, the inclined stepped surface 55 may be inclined to more easily guide the flow of fluid in a downward direction.

Figure 6A:
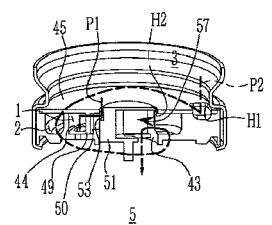
FIGS. 6A to 6C are exemplary operating diagrams of an active engine mounting device according to an exemplary embodiment of the present disclosure.
Figure 6B:
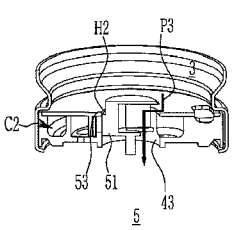
Figure 6C:
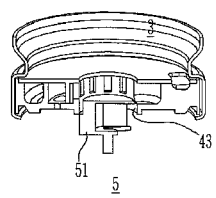

FIGS. 6A to 6C are operating diagrams of an active engine mounting device according to an exemplary embodiment of the present disclosure. For convenience of understanding, the active engine mounting device according to the exemplary embodiment of the present disclosure illustrated in FIGS. 2 to 4 will be described by way of example.

Referring to FIG. 6A, the plurality of channels include the first to third channels P1, P2, and P3 formed by changing the position of the valve 51, and the first to third channels P1, P2, and P3 are as follows. Referring to FIG. 6A, the fluid may flow in two directions under a hydro mount condition of a vehicle that is, a general driving condition. The valve 51 may be configured to move to connect the hollow channel 57 with the second chamber C2 and the stepped groove 53 may be disposed at an intermediate portion of the first barrier W1.

Upon a minimal displacement of the vehicle, the fluid moves through the first channel P1 formed in order from the upper liquid chamber 3 to the lower liquid chamber 5 through the second inflow aperture H2, the stepped groove 53 of the valve 51, between the first barriers W1, the membrane 50, the first chamber C1, and the aperture 44. The active engine mounting device 1 may reduce the dynamic characteristics by reducing the effect of the fluid while the fluid moves to the first channel P1.

Second, upon an increased displacement of the vehicle, the active engine mounting device 1 may be configured to move a fluid through a second channel P2 formed from the upper liquid chamber 3 to the lower liquid chamber 5 through the first inflow aperture H1 of the valve cover 45, the second chamber C2, the valve operating aperture 43, and the hollow channel 57 of the valve 51, when the membrane 50 is compressed to the support end 49 of the valve cover 45 due to the pressure of the fluid to stop the first channel P1. Therefore, the active engine mounting device 1 may increase the attenuation value while the fluid moves through the second channel P2.

Referring to FIG. 6B, when the vehicle is in an idle condition, the valve 51 may be disposed at a top end through the valve operating aperture 43. Therefore, the fluid may be configured to move through the third channel P3 from the upper liquid chamber 3 to the lower liquid chamber 5 through the second inflow aperture H2, the valve operating aperture 43, and the stepped groove 53 of the valve 51. The active engine mounting device 1 may be configured to close the second channel P2 and to open the first channel P1 and the fluid moves to the third channel P3 having a minimal resistance. Therefore, the active engine mounting device 1 minimizes the dynamic characteristics while the fluid moves through the third channel P3 having a minimal resistance.

Referring to FIG. 6C, when the vehicle is in the handling condition, the valve 51 may be disposed at a bottom end through the valve operating aperture 43. The active engine mounting device 1 may be configured to block the upper liquid chamber 3 and the lower liquid chamber 5 when the valve 51 moves in a downward direction. Therefore, the active engine mounting device 1 may be robust while the fluid acts as a resistance to increase characteristics. In particular, the active engine mounting device 1 may adjust characteristics while the fluid moves through the first to third channels P1, P2, and P3 as described above by moving the valve 51 stepwise according to the operating mode in response to the driving of the vehicle.

Therefore, the active engine mounting device 1 according to the exemplary embodiment of the present disclosure may be configured to selectively open and close the three channels P1, P2, and P3 formed by the valve housing 41 and the valve cover 45 disposed in the main case 20 by the valve 51 connected with the motor 60 to move the fluid to adjust the vibration input from the engine in response to each driving condition, thereby more effectively attenuating the vibration. Therefore, the active engine mounting device 1 according to the exemplary embodiment of the present disclosure may adjust the characteristics according to the driving mode of the vehicle with the simplified configuration, and may simultaneously satisfy the NVH performance and the R & H performance.

While this disclosure has been described in connection with what is presently considered to be exemplary embodiments, it is to be understood that the disclosure is not limited to the disclosed exemplary embodiments, but, on the contrary, is intended to cover various modifications and equivalent arrangements included within the spirit and scope of the appended claims.

DESCRIPTION OF SYMBOLS

1: Active engine mounting device
3: Upper liquid chamber
5: Lower liquid chamber
10: Insulator
11: Mounting bolt
13: Core
20: Main case
21: Fixed end
30: Diaphragm
40: Valve unit
41: Valve housing
43: Valve operating aperture
44: Aperture
45: Valve cover
47: Cap portion
49: Support end
50: Membrane
51: Valve
53: Stepped groove
55: Inclined stepped surface
57: Hollow channel
60: Actuator
61: Auxiliary case
63: Connecting member
C1: First chamber
C2: Second chamber
W1: First barrier
W2: Second barrier
W3: Third barrier
H1: First inflow aperture
H2: Second inflow hold
P1: First channel
P2: Second channel
P3: Third channel

What is claimed is:

1. An active engine mounting device, comprising:
an upper liquid chamber and a lower liquid chamber partitioned therein by a valve unit and configured to change a vibration and a load input from an engine in response to a driving condition when a fluid filled in each liquid chamber passes through the valve unit and attenuate the vibration and the load;
an insulator that encloses a core integrally formed with a mounting bolt and is elastically deformed based on the load applied to the core;
a main case mounted at a circumference of a lower end portion of the insulator;
a diaphragm mounted under the main case,
wherein the valve unit is configured to selectively pass the fluid through a plurality of channels based on an operation of the valve disposed at a center thereof while a valve housing and a valve cover are assembled in the main case; and
an actuator disposed through an auxiliary case to drive the valve in an axial direction, at a lower portion of the diaphragm,
wherein the valve unit includes:
a valve housing having a first chamber with a plurality of first barriers disposed in a set section at a predetermined interval along a circumference of the valve operating aperture formed at a center thereof, annular second barriers formed on a radial exterior side of the first barriers while being spaced at a predetermined interval, an aperture connected with the lower liquid chamber formed on a bottom surface thereof between the first barriers and the second barrier, and a second chamber having annular third barriers formed on a radial exterior side of the second barrier while being spaced apart at a predetermined interval and connected with the valve operating aperture together with the second barrier;
a valve cover coupled to an upper portion of the valve housing, having a first inflow aperture connected with the second chamber disposed on one side thereof and having a second inflow aperture penetrating therethrough and disposed at a center thereof, corresponding to the valve operating aperture;
a membrane that encloses the first barriers, in the first chamber; and a valve configured to be vertically guided by the first barriers through the valve operating aperture, having a stepped groove disposed at an upper circumference thereof, corresponding to the first barriers and a hollow channel open to one side connected with the second chamber connected with the lower liquid chamber.

2. The active engine mounting device of claim 1, wherein the second inflow aperture is formed in plural along a circumference of a cap portion penetrating through the center of the valve cover and protruding in an upward direction, and a circumference surface of the upper end portion of the valve is formed as an inclined blocking surface.

3. The active engine mounting device of claim 1, wherein the second chamber has a bottom surface formed in a spiral shape.

4. The active engine mounting device of claim 1, wherein the valve cover has a plurality of support ends that support the membrane formed at a central portion of a lower surface thereof.

5. The active engine mounting device of claim 1, wherein the membrane is formed as a plate of an elastic material that is deformed based on a pressure of fluid.

6. The active engine mounting device of claim 1, wherein the actuator is a linear step motor.

7. The active engine mounting device of claim 1, wherein the plurality of channels include:
   a first channel formed from the upper liquid chamber to the lower liquid chamber through the second inflow aperture, the stepped groove, between the first barriers, the membrane, the first chamber, and the aperture;
   a second channel formed from the upper liquid chamber to the lower liquid chamber through the first inflow aperture, the second chamber, the valve operating aperture, and the hollow channel; and
a third channel formed from the upper liquid chamber to the lower liquid chamber through the second inflow aperture, the valve operating aperture, and the stepped groove.

\* \* \* \* \*